(12) United States Patent
Neubrand

(10) Patent No.: US 7,118,161 B2
(45) Date of Patent: Oct. 10, 2006

(54) FOLDING TOP FOR VEHICLE WITH RIGID REAR PANEL

(75) Inventor: Frank Neubrand, West Bloomfield, MI (US)

(73) Assignee: Wilhelm Karmann GmbH, Osnabruck (DE)

( * ) Notice: Subject to any disclaimer, the term of this patent is extended or adjusted under 35 U.S.C. 154(b) by 0 days.

(21) Appl. No.: 10/640,517

(22) Filed: Aug. 13, 2003

(65) Prior Publication Data

US 2004/0084929 A1 May 6, 2004

Related U.S. Application Data

(60) Provisional application No. 60/445,094, filed on Feb. 5, 2003, provisional application No. 60/403,601, filed on Aug. 14, 2002.

(51) Int. Cl.
*B60J 7/08* (2006.01)
*B60J 7/10* (2006.01)
*B60J 7/12* (2006.01)

(52) U.S. Cl. .......................... 296/107.15; 296/107.08; 296/107.16; 296/107.17

(58) Field of Classification Search .......... 296/107.09, 296/107.08, 108, 109, 107.01, 117, 107.16, 296/107.17, 107.15, 121, 116
See application file for complete search history.

(56) References Cited

U.S. PATENT DOCUMENTS

| | | | |
|---|---|---|---|
| 2,141,842 A | 12/1938 | Lohman | |
| 2,181,869 A | 12/1939 | Carr | |
| 2,794,672 A | 6/1957 | Burzi | |
| 4,634,171 A | 1/1987 | McKeag | |
| 5,207,474 A | 5/1993 | Licher | |
| 5,829,821 A * | 11/1998 | Aydt et al. | ................... 296/122 |
| 5,988,729 A | 11/1999 | Klein | |
| 6,142,555 A | 11/2000 | Huber | |
| 6,209,945 B1 * | 4/2001 | Aydt et al. | ................ 296/120.1 |
| 6,270,143 B1 * | 8/2001 | Heselhaus et al. | ..... 296/107.01 |
| 6,336,673 B1 * | 1/2002 | Rothe et al. | ........... 296/107.17 |
| 6,343,829 B1 | 2/2002 | Busch | |
| 6,390,532 B1 * | 5/2002 | Mac Farland | .......... 296/107.17 |
| 6,422,637 B1 * | 7/2002 | Mac Farland | .......... 296/107.15 |
| 6,439,642 B1 * | 8/2002 | Mac Farland | ................ 296/108 |
| 6,505,881 B1 | 1/2003 | Kinnanen | |
| 6,568,751 B1 | 5/2003 | Reinsch | |
| 6,572,175 B1 | 6/2003 | Schutt et al. | |
| 6,592,169 B1 | 7/2003 | Obendiek | |
| 6,793,267 B1 * | 9/2004 | Hesselhaus | ............ 296/107.12 |

(Continued)

FOREIGN PATENT DOCUMENTS

DE 695169 8/1940

(Continued)

*Primary Examiner*—D. Glenn Dayoan
*Assistant Examiner*—Greg Blankenship
(74) *Attorney, Agent, or Firm*—Gifford, Krass, Groh, Sprinkle, Anderson & Citkowski, PC

(57) ABSTRACT

A retractable top system for a vehicle includes a front section, a middle section, and a rear section. Each of the sections has an inner surface that face the passenger compartment of the vehicle when the top is in the extended position, and an opposed outer surface. The rear section is a rigid panel that extends between opposed side edges and between forward and rearward edges of the rear section. A flexible roof membrane covers at least the outer surfaces of the front section and middle section when the top is in the extended position. When the top is in the retracted position, the outer surface of the front section is directed upwardly and the outer surface of the middle section is directed downwardly.

38 Claims, 11 Drawing Sheets

U.S. PATENT DOCUMENTS

| | | | |
|---|---|---|---|
| 6,796,597 B1 * | 9/2004 | Mac Farland | 296/108 |
| 2002/0003355 A1 * | 1/2002 | Mac Farland | 296/108 |
| 2002/0074822 A1 * | 6/2002 | Rothe et al. | 296/107.07 |
| 2004/0145212 A1 | 7/2004 | MacFarland | |

FOREIGN PATENT DOCUMENTS

| | | |
|---|---|---|
| DE | 34 16 286 A1 | 4/1984 |
| DE | 38 06 647 | 7/1989 |
| DE | 38 09 198 | 9/1989 |
| DE | 42 28 065 A1 | 4/1994 |
| DE | 43 16 485 A1 | 11/1994 |
| DE | 299 21 458 A1 | 3/2000 |
| DE | 198 46 006 A1 | 4/2000 |
| DE | 102 05 935 A1 | 8/2003 |
| EP | 0 332 811 A2 | 9/1989 |
| EP | 0 835 778 B1 | 7/2001 |
| JP | 62-31516 | 2/1987 |
| JP | 2-306822 | 12/1990 |
| JP | 6-156086 A | 6/1994 |

* cited by examiner

FOLDING TOP FOR VEHICLE WITH RIGID REAR PANEL

REFERENCE TO RELATED APPLICATIONS

This patent application claims priority from U.S. provisional patent application Ser. No. 60/445,094, filed Feb. 5, 2003; and U.S. provisional patent application Ser. No. 60/403,601, filed Aug. 14, 2002, both of which are incorporated herein in their entirety by reference.

FIELD OF THE INVENTION

The present invention relates generally to retractable roof structures for automobiles and, more specifically, to a retractable top with a rigid rear panel.

BACKGROUND OF THE INVENTION

Most vehicles have rigid roof structures that permanently extend over and cover the passenger compartment. Manufacturers also provide a variety of designs that offer the vehicle operator the opportunity to partially or completely uncover the passenger compartment. Sunroofs and moonroofs are some of the simplest designs, and offer the opportunity to open a portion of the vehicle roof for increased airflow. More complicated designs allow the entire roof structure to be retracted and stored behind the passenger compartment.

Retractable roof systems generally fall into two categories. The most common type of retractable roof design is a convertible soft top or roof. These designs include an articulating structural framework with a flexible cloth or plastic outer skin. In an extended position, the front end of the articulating framework connects to a header above the vehicle windshield and the outer skin extends over the passenger compartment. When retracted, the articulating mechanism, along with the outer skin, fold into a compact shape.

While convertible soft tops offer the choice between a covered or uncovered passenger compartment, they also suffer from several disadvantages in comparison to traditional rigid roof structures. Vehicles with soft tops are typically less well sealed against the elements and are somewhat noisy. They are also less resistant to break-in attempts and have a less finished interior appearance.

Retractable soft tops also present challenges in the design of a rear window. In a rigid roof structure, the rear window design may be dictated by visibility and styling criteria. Large glass rear windows are typically used to provide an unobstructed view to the rear of the vehicle, and to give a pleasing aesthetic appearance. In retractable soft tops, the rear window is typically stored, along with the folded soft top, in the storage area of the vehicle. The least complicated and least expensive approach is to use a flexible plastic rear window. However, plastic rear windows often distort the view, may have an undesirable aesthetic appearance, and features such as heated rear windows cannot be provided. Some more complicated soft top designs use rigid glass windows. Some designs require the window to be stored separately from the folded top, thereby complicating retraction of the vehicle top. Other designs resort to complicated mechanisms to store the rigid rear window without unduly stressing the window. However, retractable soft top roof designs with rigid glass rear windows almost always use a rear window that is much smaller than desirable from a visibility and styling point of view. The reduced size of the window is dictated by retraction and packaging considerations.

The other type of retractable roof design is a retractable or folding hardtop roof system. Retractable hardtops consist of one or more rigid roof elements that are mechanically articulated such that they can be repositioned into a storage area behind the passenger compartment. Because the retractable hardtop consists of rigid sections, the system can provide a much closer approximation of a traditional rigid roof structure. In the extended position, a retractable hardtop securely covers and seals the passenger compartment, giving the appearance of a permanent roof. A retractable hardtop does a significantly better job of sealing the passenger compartment, reducing noise, and preventing break-ins. However, the retraction and storage of the hardtop presents significant mechanical challenges. Typically, when the retractable hardtop is in the retracted position, it resides in the portion of the vehicle traditionally provided for storage, such as the vehicle's trunk. While the storage space may be completely usable when the hardtop is in the extended position, most consumers prefer not to sacrifice the use of the storage position when the roof is retracted. There is generally a tradeoff between storage efficiency and mechanical complexity.

Most modern retractable hardtop designs consist of two or more articulated sections that are automatically folded or stacked in the storage area. In one design, referred to as a "clamshell" design, the roof structure is divided into a front section and a rear section. The front and rear sections are pivotally interconnected and the rear section is pivotally connected to a support structure behind the passenger compartment. Examples of clamshell type retractable hardtop designs are shown in U.S. Pat. No. 6,217,104 to Neubrand, and U.S. Pat. No. 5,785,375 to Alexander et al.

In a clamshell design, the front and rear sections may both be said to have an inner and an outer surface, with the outer surfaces cooperating to form the outer surface of the roof structure when in the extended position. When retracted, the front section folds so as to bring the inner surface of the front section towards the inner surface of the rear section. The front and rear sections are then together positioned into the storage area. Often, the trunk lid of the vehicle moves out of the way to allow the hardtop sections to move into a position in the trunk. The trunk lid is then repositioned to cover the pair of sections. In most designs, the front and rear sections both have generally convex outer surfaces and concave inner surfaces. Therefore, when the inner surfaces are folded towards one another, the concave shapes cause there to be a significant distance between the mid-portions of the folded front and rear sections. Consequently, clamshell designs do not store as compactly as some other designs. Their advantage is that they are significantly less complex than most other designs. Reduced complexity not only reduces manufacturing costs, but also improves reliability of the system. Clamshell designs also have better structural integrity than some other designs.

An alternative design, which provides improved storage efficiency, may be referred to as a "stacking" design. Again, the roof is divided into two or more sections. However, when the hardtop is retracted, the roof sections are stacked such that the inner surface of one section is adjacent to the outer surface of another section. Because each section typically has a concave inner surface and a convex outer surface, placing the inner surface of one section next to the outer surface of another results in more efficient space utilization. Examples of stacking retractable hardtop designs are shown in U.S. Pat. No. 6,336,673 to Rothe et al., U.S. Pat. No. 6,318,793 to Rapin et al., U.S. Pat. No. 6,053,560 to Rothe, and U.S. Pat. No. 5,979,970 to Rothe et al. As will be clear to those of skill in the art, stacking designs require significantly more complex articulation mechanisms than clamshell designs. This increased complexity leads to increased costs, reduced reliability, and reduced structural integrity.

There are retractable roof designs that combine the attributes of retractable hard tops and retractable soft tops. An example is shown in U.S. Pat. No. 6,422,637 to Mac Farland. In this design, the retractable roof structure includes three rigid roof sections and a flexible outer skin that is stretched over and covers the roof sections when the roof is in the closed or extended position. The flexible outer skin seals the roof, with the rigid sections defining the structure and shape of the roof. The Mac Farland design has a complicated folding design such that it does not significantly reduce the cost, complexity, or packaging requirements as compared to a retractable hard top design.

In light of the above, there remains a need for retractable roof designs that offer an improved compromise between cost, mechanical complexity, space efficiency, and rear window design.

SUMMARY OF THE INVENTION

The present invention provides improved retractable top systems for vehicles with a passenger compartment and a storage area behind the passenger compartment. Such a vehicle has a body and windshield defining the forward end of the passenger compartment. The windshield has a header and the top system has an extended position wherein the top system defines a roof over the passenger compartment and interconnects with the windshield header. The top system also has a retracted position wherein the top system does not cover the passenger compartment and at least a portion of the top system is disposed in the storage area.

In one embodiment, the top system includes a front section with a forward and rearward edge. The forward edge interconnects with the windshield header and the front section defines at least part of the front portion of the roof when the top system is in the extended position. The front section has an inner surface and an opposed outer surface, with the inner surface facing the passenger compartment when the top system is in the extended position. A middle section is disposed rearwardly of the front section when the top system is in the extended position. The middle section has a forward edge and a rearward edge, with the forward edge being disposed adjacent the rearward edge of the front section when the top is in the extended position. The middle section has an inner surface and an opposed outer surface, with the inner surface facing the passenger compartment when the top system is in the extended position. A rear section is disposed rearwardly of the middle section when the top system is in the extended position. The rear section has a forward edge, an opposed rearward edge, and a pair of opposed side edges extending between the forward and rearward edges. The forward edge of the rear section is disposed adjacent the rearward edge of the middle section when the top is in the extended position. The rear section is a rigid panel extending between the opposed side edges and between the forward and rearward edges.

A flexible roof membrane has a forward edge proximate the forward edge of the front section and extends rearwardly so as to cover at least the outer surfaces of the front section and the middle section when the top is in the extended position. When the top is in the retracted position, the outer surface of the front section is directed upwardly and the outer surface of the middle section is directed downwardly.

In some embodiments, the front section and middle section are each rigid panels, while in other embodiments the front section and middle section are open frames that support the flexible roof membrane.

In some embodiments of the present invention, the system further includes a pair of first links and a pair of second links. Each of these links has one end pivotally interconnected with the rear section and the other end pivotally interconnected with the middle section. The links and the middle and rear sections form a pair of parallel four-bar linkages operable to articulate the middle section with respect to the rear section such that when the top system is in the retracted position the middle section nests with the rear section and the outer surface of the middle section is adjacent the inner surface of the rear section.

An alternative embodiment of the present invention includes a rear section that defines the rearmost portion of the roof when the top system is in the extended position. The rear section has a forward edge, an opposed rearward edge, and a pair of opposed side edges extending between the forward and rearward edges. The rear section has an inner surface and an opposed outer surface, with the inner surface facing the passenger compartment when the top is in the extended position. The rear section is a rigid panel that extends between the opposed side edges and between the forward and rearward edges. A forward section is disposed forwardly of the rear section when the top is in the extended position. The forward section is an open frame and has an inner surface and an outer surface, with the inner surface facing the passenger compartment when the top is in the extended position. The system further includes a pair of first links and a pair of second links. Each of the links has one end pivotally interconnected with the rear section and another end pivotally interconnected with the forward section. The links and the forward and rear sections form a pair of parallel four-bar linkages operable to articulate the forward section with respect to the rear section such that when the top system is in the retracted position, the forward section nests with the rear section and the outer surface of the forward section is adjacent the inner surface of the rear section. A flexible roof membrane covers at least the outer surface of the forward section when the top system is in the extended position.

In some versions of this alternative embodiment, the top system further includes a front section disposed forwardly of the forward section when the top is in the extended position. The front section has a forward edge and a rearward edge, with the forward edge of the front section interconnecting with the windshield header and the front section defining at least part of the front portion of the roof when the top system is in the extended position. The front section has an inner surface and an opposed outer surface, with the inner surface facing the passenger compartment when the top system is in the extended position. The flexible roof membrane further covers the outer surface of the front section when the top system is in the extended position.

Another alternative embodiment of the present invention provides a top system with a rear section defining the rearmost portion of the roof when the top system is in the extended position. The rear section has a forward edge, an opposed rearward edge, and a pair of opposed side edges extending between the forward and rearward edges. The rear section has an inner surface and an opposed outer surface, with the inner surface facing the passenger compartment when the top system is in the extended position. The rear section is a rigid panel extending generally continuously between the opposed side edges and between the forward and rearward edges. A middle section is disposed forwardly of the rear section when the top system is in the extended position. The middle section has a forward edge, an opposed rearward edge, and a pair of opposed side edges extending between the forward and rearward edges. The rearward edge is disposed adjacent the forward edge of the rear section when the top system is in the extended position. The middle section has an inner surface and an opposed outer surface, with the inner surface facing the passenger compartment when the top system is in the extended position. The middle section is a rigid panel extending generally continuously between the opposed side edges and between the forward and rearward edges. A front section is disposed forwardly of the middle section when the top section is in the extended position. The middle section has a forward edge, an opposed rearward edge, and a pair of opposed side edges extending between the forward and rearward edges. The rearward edge is disposed adjacent the forward edges of the middle section and the forward edge of the front section interconnects with the windshield header when the top is in the extended position. The front section has an inner surface and an opposed outer surface. The inner surface faces the passenger compartment when the top system is in the extended position. The front section is a rigid panel extending generally continuously between the opposed side edges and between the forward and rearward edges. The system further includes a pair of first links and a pair of second links. Each of the links have one end pivotally interconnected with the rear section and another end pivotally interconnected with the middle section. The links in the middle and rear sections form a pair of parallel four-bar linkages operable to articulate the middle section with respect to the rear section such that when the top system is in the retracted position the middle section nests with the rear section and the outer surface of the middle section is adjacent the inner surface of the rear section. The rearward edge of the front section is pivotally interconnected with the forward edge of the middle section. The front section is articulated with respect to the middle section such that the inner surface of the front section faces the inner surface of the middle section when the top system is in the retracted position. A flexible roof membrane covers at least the outer surfaces of the front section and middle section when the top system is in the extended position.

In yet another alternative embodiment of the present invention, a retractable top system provides either a retractable hardtop or a retractable soft top during manufacturing of a plurality of vehicles having substantially common body structures. Each of the vehicles has a passenger compartment and a storage area behind the passenger compartment. Each of the vehicles further has a body and a windshield defining the forward end of the passenger compartment and a plurality of attachment points for connecting a retractable top thereto. The system includes a retractable soft top version, which has an extended position wherein the top version defines a roof over the passenger compartment and interconnects with the windshield header and a retracted position wherein the top version does not cover the passenger compartment and at least a portion of the top version is disposed in the storage area. The soft top version includes a plurality of roof sections, with at least one section being an open frame. Each of the sections has an inner surface and an opposed outer surface. The inner surfaces face the passenger compartment when the soft top version is in the extended position. The soft top version further includes a flexible membrane covering at least a portion of the outer surfaces of each of the roof sections. A retractable hardtop version has an extended position wherein the top version defines a roof over the passenger compartment and interconnects with the windshield header in a retracted position wherein the top version does not cover the passenger compartment and at least a portion of the top version is disposed in the storage area. The hardtop version includes a plurality of roof sections. Each roof section has a forward edge, an opposed rearward edge, and a pair of opposed side edges extending between the forward and rearward edges. Each roof section is a rigid panel extending generally continuously between the forward and rearward edges and between the opposed side edges. A vehicle with a retractable hardtop is manufactured by assembling the hardtop version to one of the vehicle bodies and a vehicle with a retractable soft top is manufactured by assembling the soft top version to one of the vehicle bodies.

Other embodiments of the present invention are also disclosed herein.

DETAILED DESCRIPTION OF THE PREFERRED EMBODIMENTS

FIGS. 1–6 illustrate a first embodiment of a retractable top design according to the present invention. It is a hybrid design wherein the top preferably has a rigid rear section, a middle frame, and a front frame. A flexible membrane such as a cloth, extends over the front frame and middle frame to define the upper surface of the top system, while the rear section may or may not be covered by the roof membrane. The rigid rear section allows the use of a large rear window, and rigidly defines the rearmost portion of the top. This leads to better sealing and enhanced structure to the roof. The use of front and middle frames with a covering, instead of rigid roof panels, leads to improved packaging as compared to some retractable hard tops.

Figure 1:
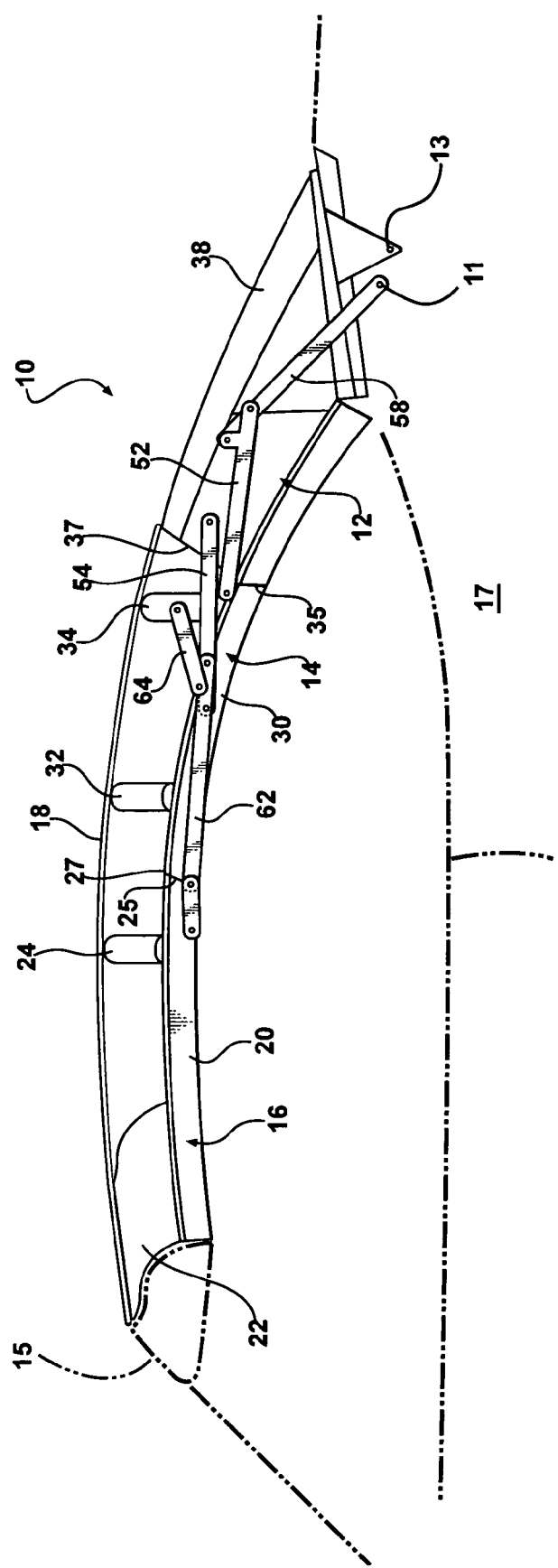
FIG. 1 is an elevational side view of a retractable soft top with a rigid rear panel, according to the present invention, various components being shown as partially transparent for ease of description.

FIG. 1 illustrates a side elevational view of the top system 10. The rigid rear portion is shown at 12, the middle frame is shown at 14, and the front frame is shown at 16. The roof membrane is indicated at 18. The front frame 16 includes a pair of side rails, with only one side rail 20 being shown in FIG. 1. FIG. 1 shows one half of the top system 10, with it being understood that the other half is substantially a mirror image.

The front frame 16 preferably also includes a front header member 22 that extends between the side rails 20 and defines the forward end of the front frame 16. This header member 22 preferably interconnects with the upper end of the windshield frame of the vehicle when the top is in the extended position. The front frame 16 also includes a roof bow 24 spaced rearwardly from the header member 22, and which extends side-to-side and is interconnected with the side rails 20. The side rails may be said to have a rearmost end which defines the rearward edge 25 of the front frame 16.

The middle frame 14 has a forward edge 27 which is disposed adjacent to the rearward edge 25 of the front frame 16 when the top system is in the extended position. Like the front frame 16, the middle frame 14 has a pair of side rails, one of which is indicated at 30. A front bow 32 and a rear bow 34 extend side-to-side between the side rails 30 of the middle frame 14. In one embodiment, the front bow 32 is rigidly interconnected with the side rails 30, while the rear bow 34 has its ends pivotably interconnected with the side rails 30. The rear bow 34 preferably folds with respect to the side rails 30 during retraction of the top system 10, as will be clear from FIGS. 2–6. The side rails 30 may be said to have rear-most end which defines the rearward edge 35 of the middle frame 14. Both the front frame 16 and middle frame 18 may be said to have a pair of opposed side edges, which are defined by the side rails 20 and 30 that extend between the forward and rearward edges of the respective frames.

The rear section 12 is preferably a rigid panel that may or may not be covered by the membrane 18. In one embodiment, the membrane 18 is connected to the forward edge 37 of the rear section 12 and extends forwardly and is connected at its other end to the forward edge of the front frame 16. The rear section then is exposed and may have a traditional painted exterior with a rear window 38 positioned therein, may be entirely glass, or may be covered with a material to match the membrane 18.

In another embodiment, the membrane 18 extends so as to partially cover the rear section 12. This would give an appearance more similar to a traditional soft top, though it allows the provision of a larger rear window than would typically be possible with a retractable soft top.

FIGS. 2–6 show the top system 10 in various retraction positions. As shown in FIGS. 2–6, the membrane 18 flexes as the top retracts. As the top system 10 retracts, the rear section 12 flips over such that the inside of the rear section is directed generally upwardly. The middle frame 14 also flips over and nests or stacks against or inside of the rear portion 12. The front frame 16 does not flip. Instead, the front frame remains with the upper surface directed upwardly and the lower surface directed downwardly.

As will be clear to those of skill in the art, the linkage system illustrated may be altered in various ways without departing from the teaching of the present invention. That is, a similar folding approach may be accomplished through various other linkage designs. Also, the top may be folded in ways other than illustrated.

Figure 2:
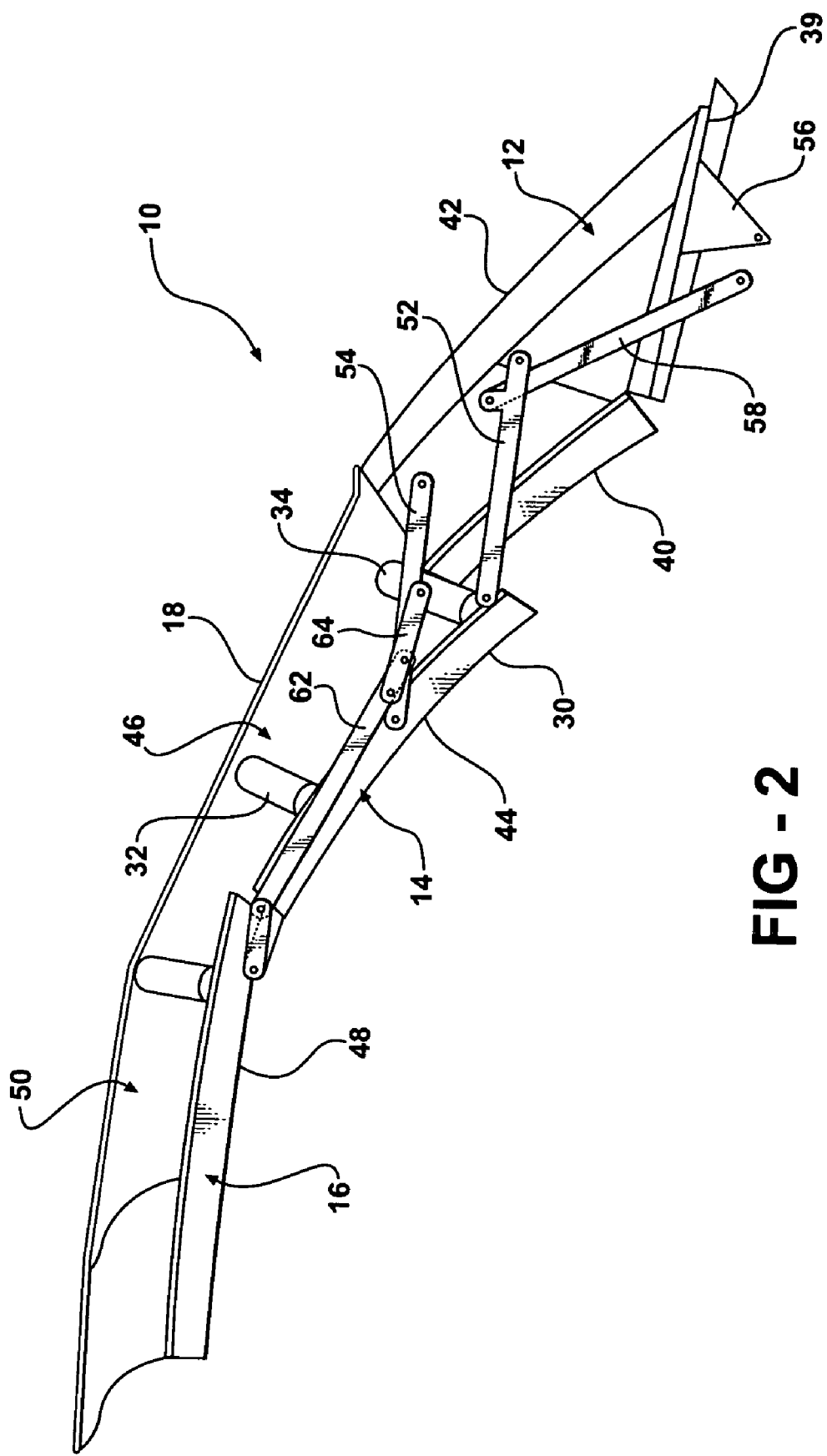
FIG. 2 is a side view of the top of FIG. 1, with the top partially retracted.

Referring again to FIGS. 1–6, the illustrated linkage system and corresponding articulation of this preferred embodiment of the present invention will be described in more detail. For definitional purposes, the three sections of the top are each defined as having inner surfaces, which face the passenger department when the top is in the extended position, and opposed outer surfaces. In FIG. 2, the inner surface of rear section 12 is shown at 40, while the outer surface is shown at 42. The inner surface 40 may be covered with material such as headliner material, while the outer surface may be visible to the exterior of the vehicle with the top extended, or may be covered by the flexible membrane 18. The middle frame or section 14 has an inner surface shown at 44 and an outer surface shown at 46. The inner surface comprises the inner surfaces of the side members 30 and bows 32 and 34. The outer surface comprises the outer surfaces of these components. The front section or frame 16 has an inner surface shown at 48 and an outer surface shown at 50. For definitional purposes, the rear section 12, may also be said to have a rearward edge 39 with a rigid panel defining the rear section 12 extending between the forward edge 37 and rearward edge 39 and the opposed side edges.

FIGS. 1–6 show the various components of the linkage system in their various positions during retraction of the top. As will be clear to those who of skill in the art, the linkage system preferably includes an identical set of links on each side of the vehicle. However, since FIGS. 1–6 provide a side-elevation view, only one set of links is shown. It will be understood that a parallel and identical set is preferably provided.

A first link 52 and a second link 54 each have one end pivotably interconnected with the rear section 12 and another end pivotably interconnected with the middle frame 14. Together, the links 52 and 54 and the rear section 12 and middle frame 14 form a four-bar linkage for articulating the middle frame 14 with respect to the rear section 12. This causes the middle frame 14 to nest into the rear section 12 when the top is retracted, such that the outer surface 46 of the middle frame 14 is adjacent the inner surface 40 of the rear section 12.

As shown, the rear section 12 may have a downwardly extending bracket 56 that provides pivotal interconnection to the vehicle body 17. This is preferably a simple pivot about which the rear section articulates during retraction and extension of the top. However, this pivot point may also be moveable either via a linkage or a slide or driven mechanism. A balance link 58 may be provided with one end pivotably interconnected to the vehicle body and the other end pivotably interconnected to the first link 52 between its two ends. As shown, the pivotal interconnection between the balance link 58 and the first link 52 is preferably located close to the rearward end of the first link 52. While balance link 58 is shown as having a simple pivot to the vehicle body, it may instead have a floating connection such that the pivot point moves upwardly and or rearwardly during retraction of the top. This provides a more efficient geometry.

Figure 3:
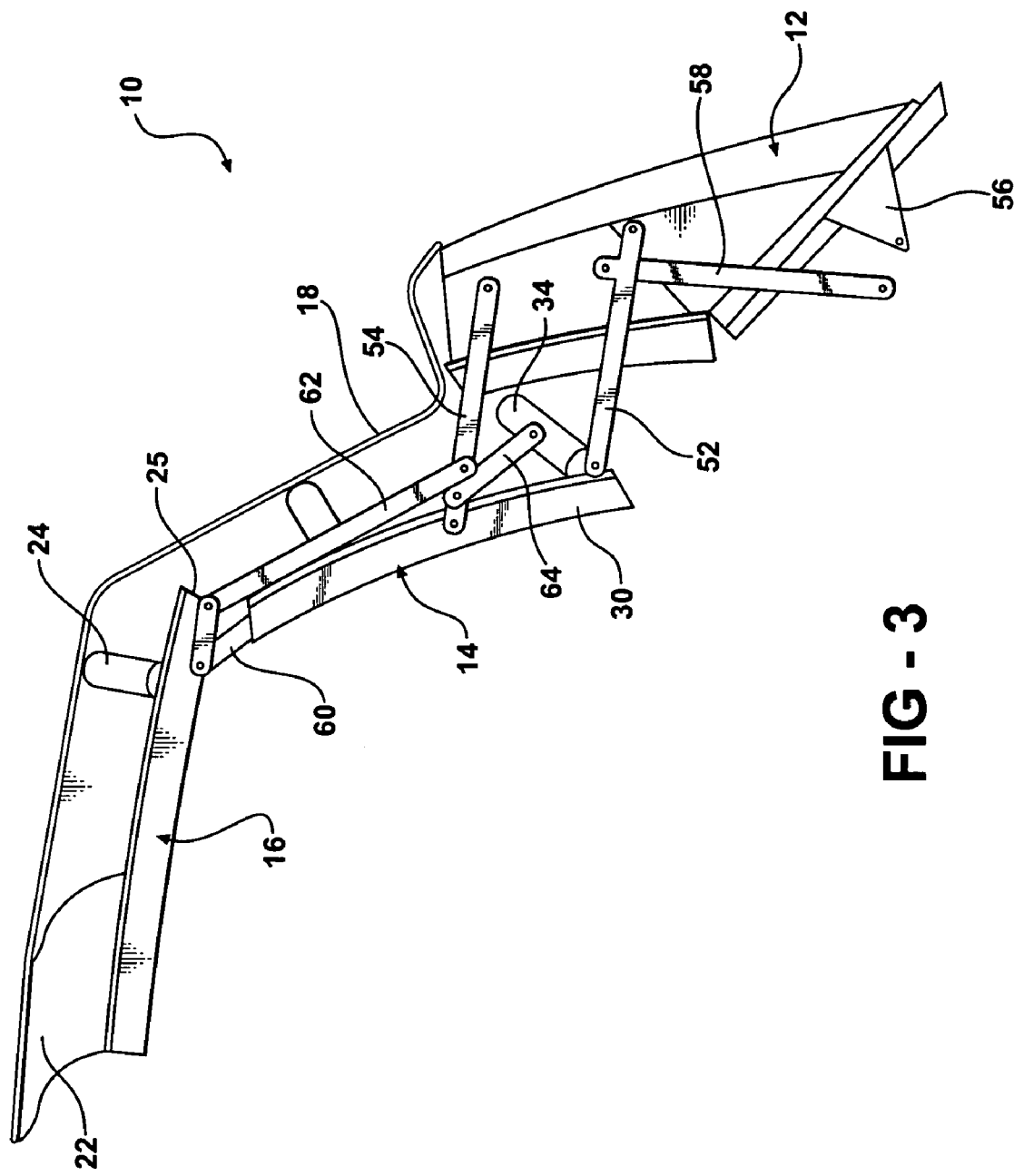
FIG. 3 is a side view of the top of FIGS. 1 and 2, with the top further retracted.
Figure 4:
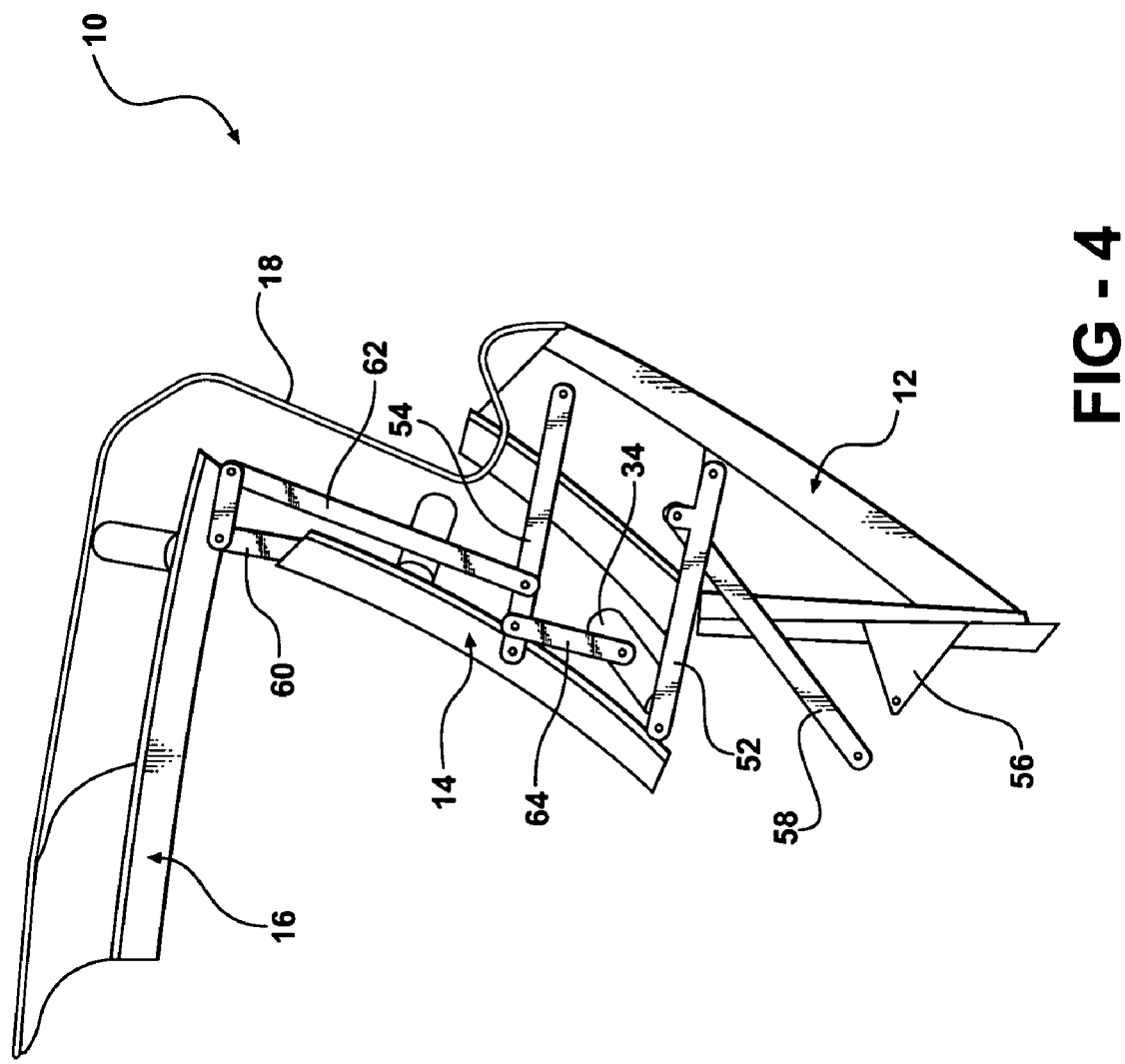
FIG. 4 is a side view of the top of FIGS. 1–3, with the top retracted yet further.
Figure 5:
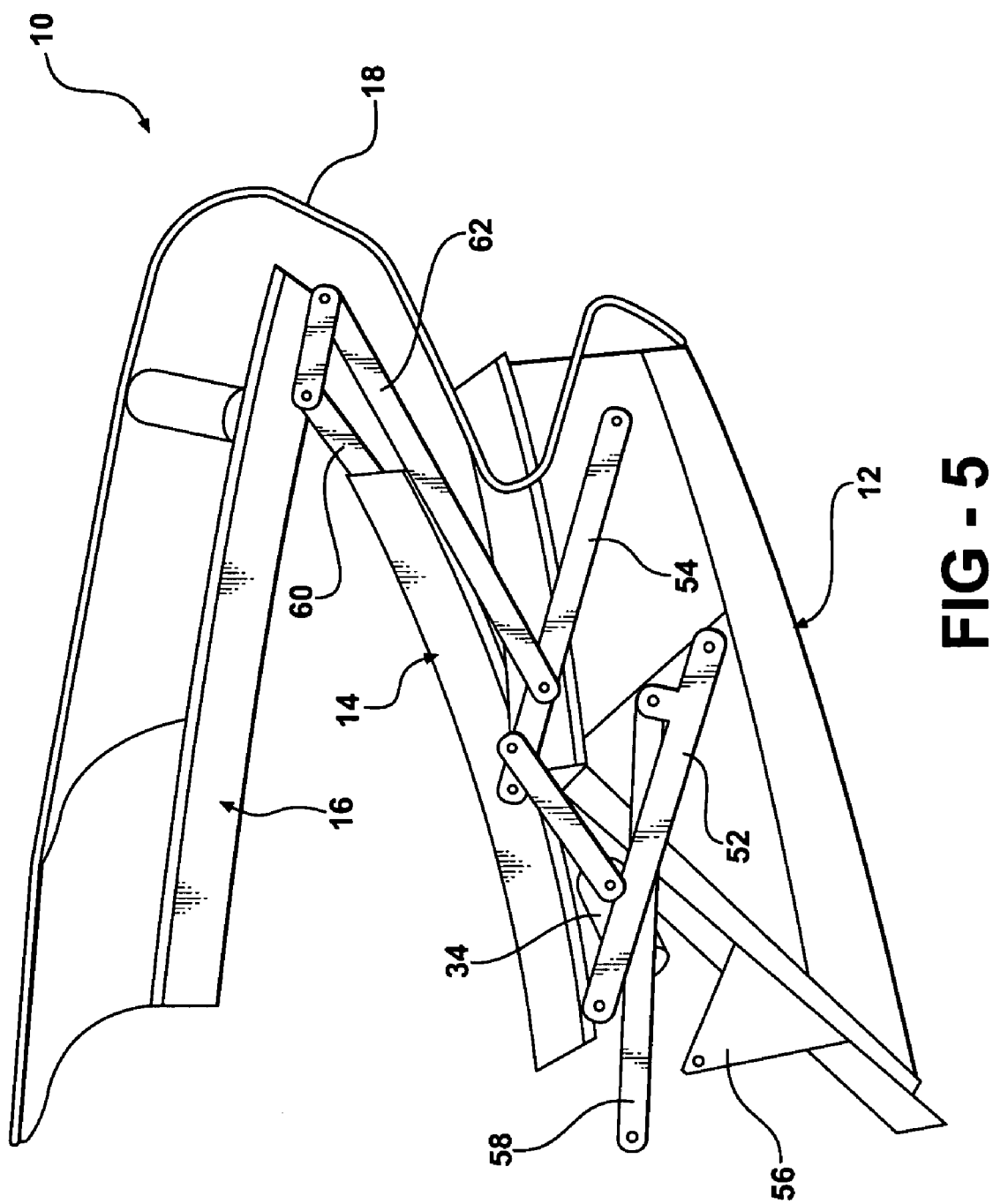
FIG. 5 is a side view of the top of FIGS. 1–4, with the top almost completed retracted.
Figure 6:
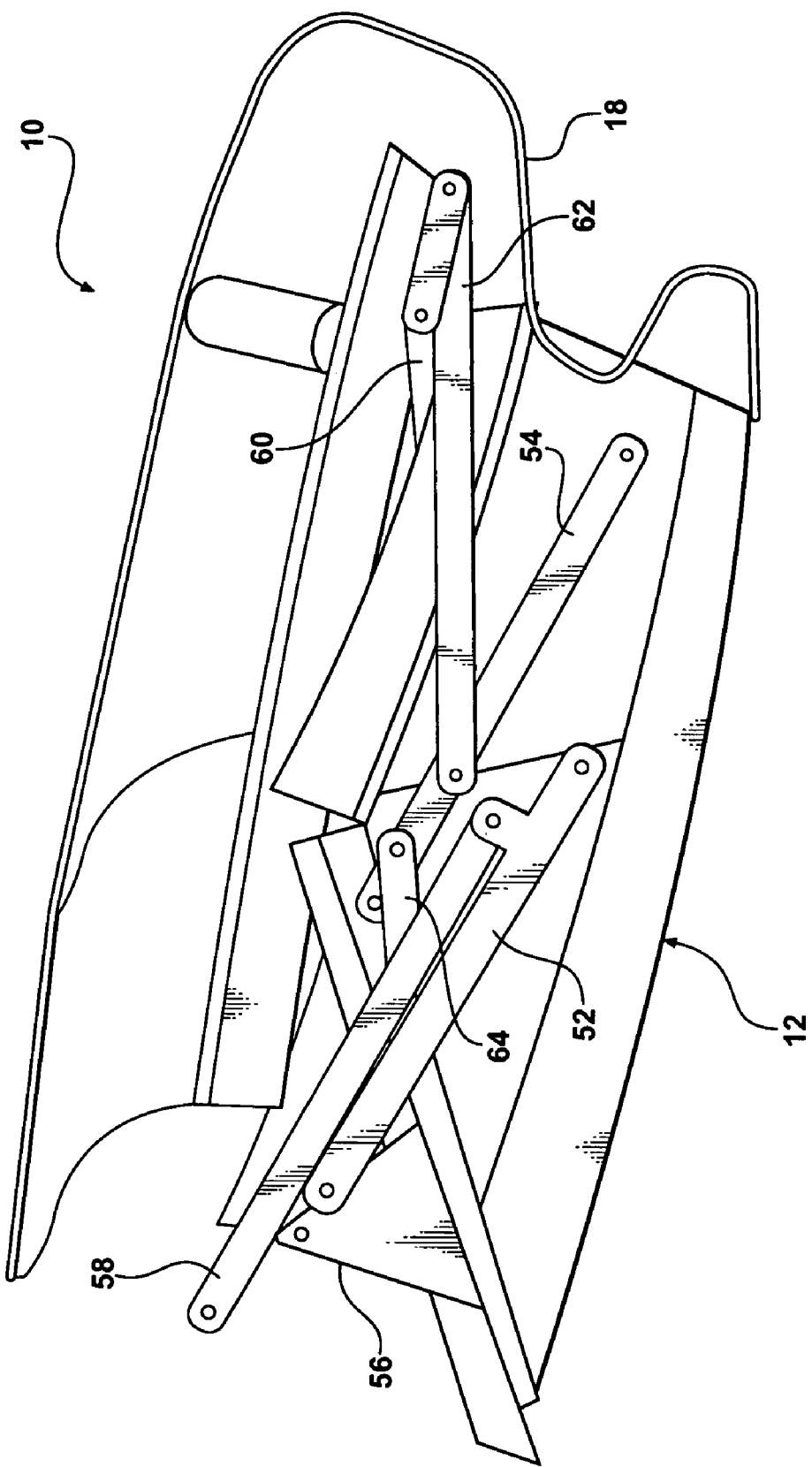
FIG. 6 is a side view of the top of FIGS. 1–5, with the top fully retracted, in a retracted or storage position.

As best shown in FIG. 3, the middle frame 14 has a forwardly extending pivot bracket 60 with the front frame 16 pivotably interconnected to this bracket 60 adjacent its rearward edge 25. In the illustrated embodiment, the front frame 16 is articulated with respect to the middle frame 14 by a third link 62. The third link has one end pivotably interconnected to the front frame 16 at a position rearward of the pivotal interconnection between the front frame 16 and the bracket 60. The other end of the third link 62 is pivotably interconnected with the second link 54 close to its forward end. As the rear section 12 articulates by rotating clockwise, as viewed from the driver's side, the balance link 58 causes the first and second links 52 to move with respect to the rear section 12 so as to articulate the middle frame 14 downwardly with respect to the rear section 12. The movement of the second link 54 causes the third link 62 to move forwardly with respect to the middle frame 14, thereby articulating the front frame 16 with respect to the middle frame 14.

In some embodiments, it is preferred that the bow 34 pivot with respect to the middle frame to provide more packaging clearance. To accomplish this, the bow 34 is pivotally interconnected with the side members 30 at its ends. A bow link 64 has one end pivotally interconnected to the bow 34 and the other end pivotally interconnected to the second link 54 near its forward end. As the top articulates, the bow link 64 cause the bow 34 to pivot, as shown. As will be clear to those skilled in the art, the configuration of the linkage system may be altered without departing from the scope or teaching of the present invention. As one example, the connection between the middle frame 14 and front frame 16 may be more complicated than as shown, such as a seven bar linkage or a scissors linkage. The system could also be designed so as to articulate the front frame 16 in the opposite direction from shown. Other changes to the linkage system could also be made.

It should be noted that various sections of the top are described herein as being adjacent to one another. For purposes of the present invention, when edges of particular sections or parts of the roof are described as being adjacent to one another, these edges may not necessarily abut along the entire edges, but may be adjacent one another only in certain areas. Also, the portions of the roof described herein as a middle part or section may alternatively be referred to as a forward section in the claims.

Referring now to FIGS. 7–11, a second embodiment of the present invention will be discussed. In this embodiment, the roof design consists of three rigid panels with a cloth membrane that covers some or all of them. This design provides some of the rigidity and sealing advantages of a retractable hard top, while allowing some packaging advantages as compared to retractable hard tops.

Figure 7:
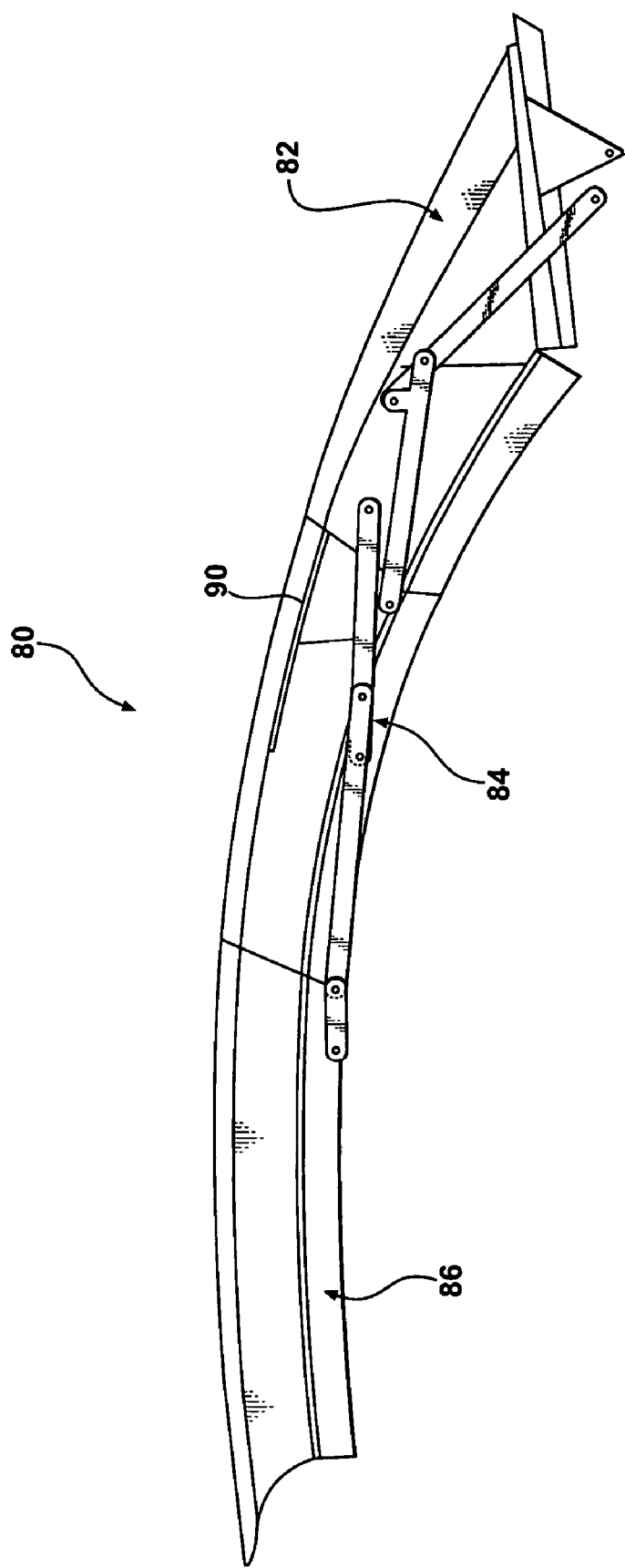
FIG. 7 is an elevational side view of a second embodiment of a retractable top according to the present invention.

Referring to FIG. 7, the top system 80 includes a rear portion 82, a middle portion 84, and a front portion 86. A flexible membrane 88 covers the upper surfaces of at least the front portion 86 and middle portion 84. The membrane 88 is shown in FIG. 8, but is left out of some of the other Figures since it generally coincident with the outer surface of the three sections and difficult to illustrate.

The rear portion 82 is preferably similar or identical to the rear section 12 in the first embodiment, and may have a painted exterior with a rear window positioned therein, or may be entirely glass. It also may or may not be covered with the flexible membrane 88, or may be covered with a matching material. The middle portion 84 and front portion 86 are preferably rigid panels, and cooperate with the rear portion 82 to define the shape and structure of the top system 80. Unlike a traditional retractable hard top, the various rigid portions do not have to seal the roof of the vehicle, since the flexible membrane 88 can do so. Alternatively, the flexible membrane may cooperate with the various underlying portions to seal out the elements.

Figure 8:
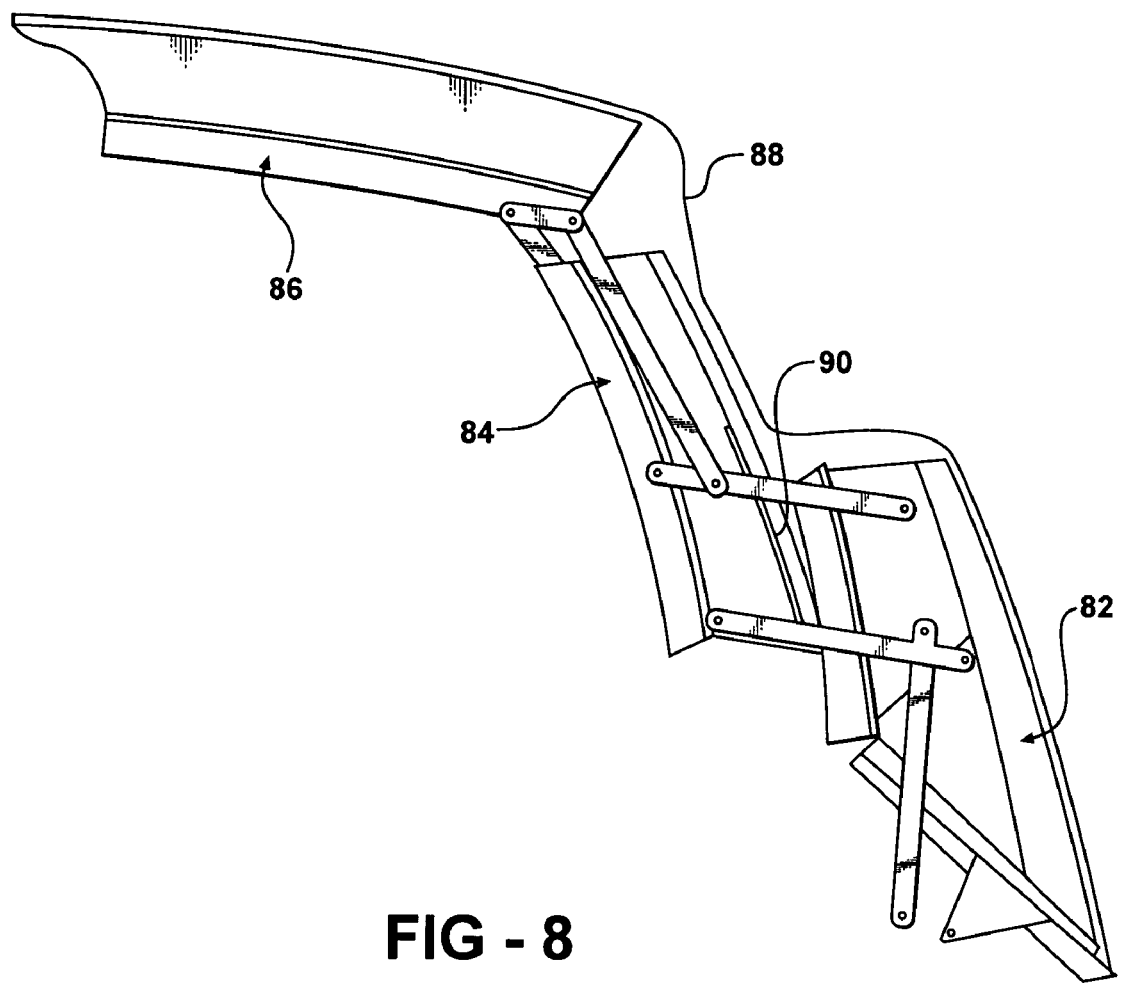
FIG. 8 is a side view of the top of FIG. 7, with the top partially retracted.
Figure 9:
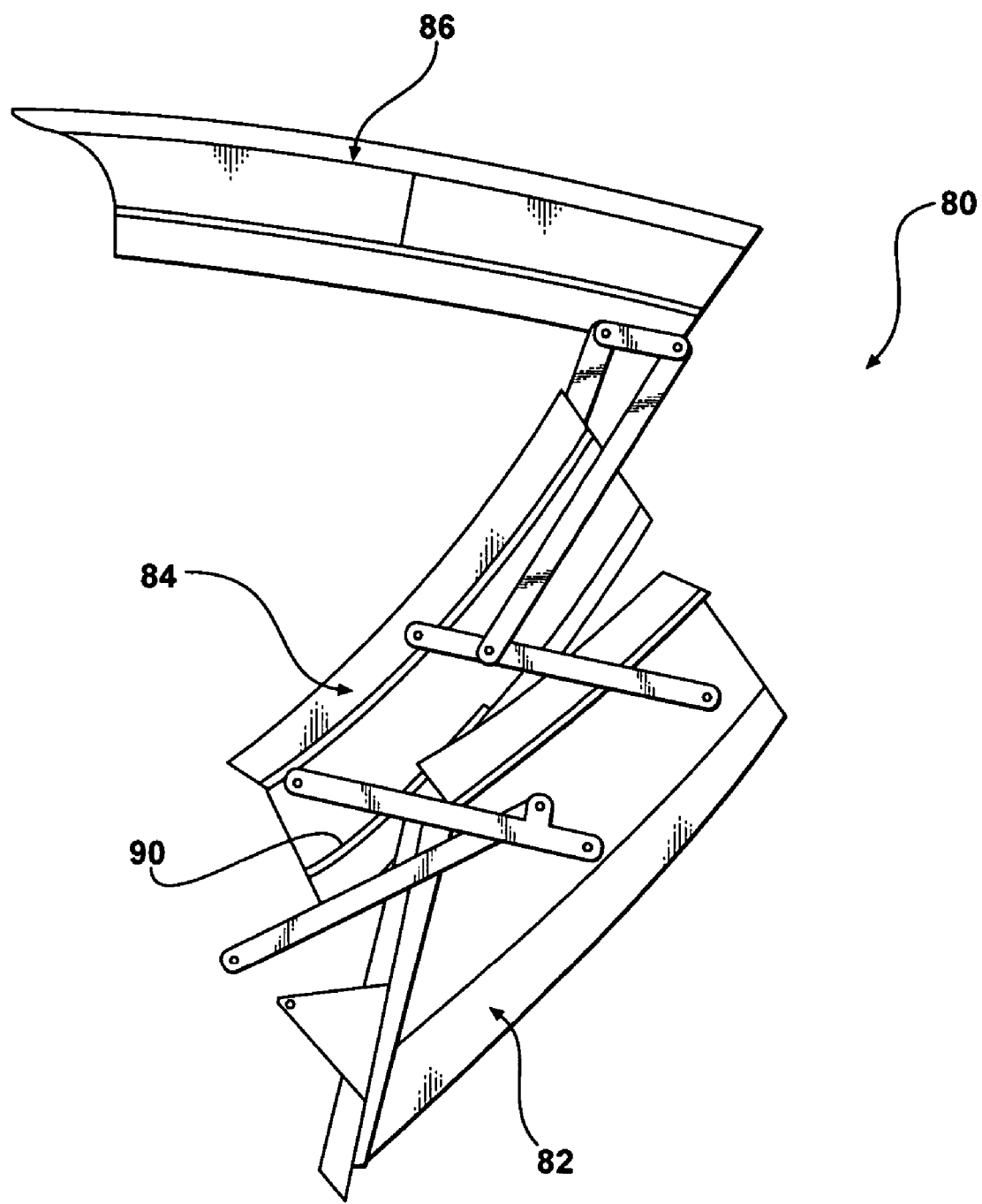
FIG. 9 is a side view of the top of FIGS. 7 and 8, with the top further retracted.
Figure 10:
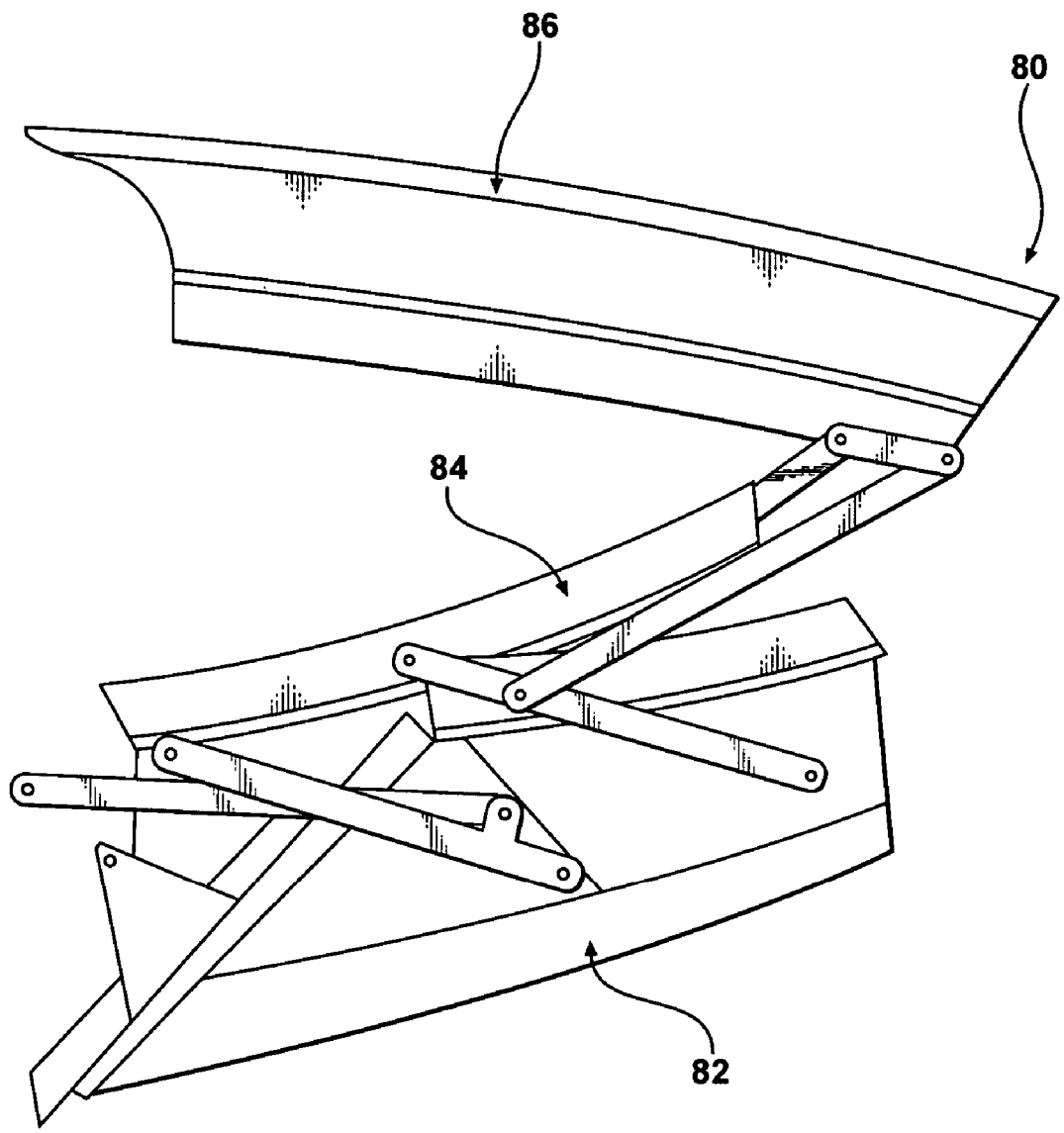
FIG. 10 is a side view of the top of FIGS. 7–9, with the top almost completely retracted.
Figure 11:
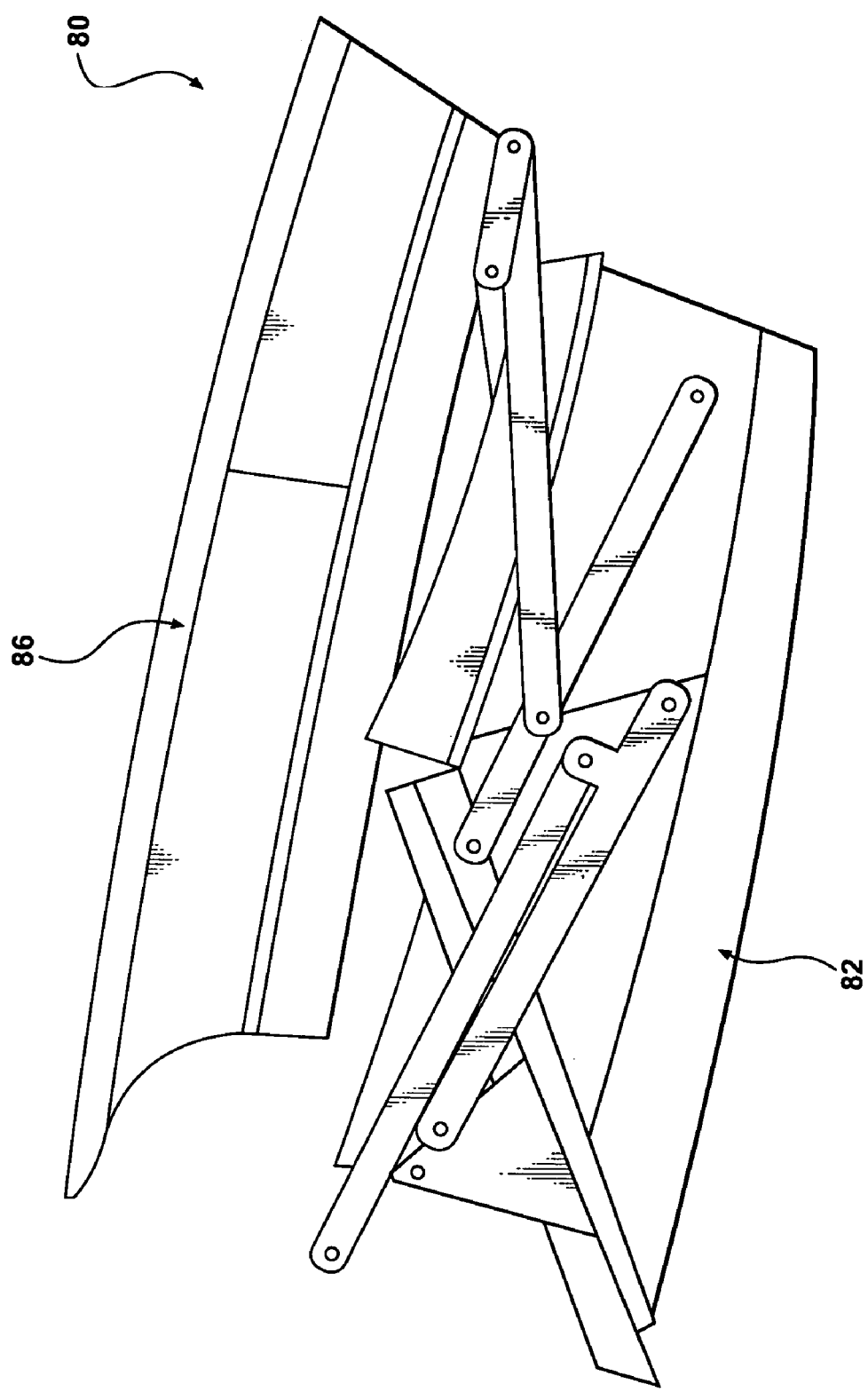
FIG. 11 is a side view of the top of FIGS. 7–10, with the top fully retracted, in a retracted or storage position.

The retraction of the top system 80 may be seen in FIGS. 8–11. As best shown in FIG. 8, the middle portion 84 may have a slot 90 therein with a linkage passing therethrough. This system is illustrated with a four-bar linkage interconnecting the middle portion 84 with the rear portion 82 so that as the top system 80 retracts, the middle portion 84 nests inside the rear portion 82. In a soft top design, a link may pass through what would be the upper surface of the middle portion if the middle portion was a rigid panel. The fact that the cloth membrane pulls away allows clearance for the linkage. On retractable hard tops, on the other hand, it is typically undesirable to have a link pass through what would be the upper surface, since this is an exposed surface when the top is extended. In the hybrid design of this embodiment, the rigid middle portion 84 is covered by the cloth membrane 88 when the top is extended. Therefore, the slot 90 may be provided without compromising the function of the top system 80.

By reference to FIGS. 7–11, it can be seen that the second embodiment of the present invention folds in a similar manner to the first embodiment. That is, the rear portion 82 flips over such that the inside surface is directed upwardly, the middle portion 84 nests inside of the rear portion 82, and the front portion remains with its upper surface directed upwardly. As shown, the embodiment of FIGS. 7–11 is otherwise similar to the embodiment of FIGS. 1–6 and therefore the linkage design and various areas will not be described further herein. However, it should be appreciated that the embodiment of FIGS. 7–11 could be altered in various ways so as to be somewhat different than the design of FIGS. 1–6. As one example, the system of FIGS. 7–11 may eliminate the membrane 88 and otherwise seal the slot 90. Also, a different linkage approach may be used so as to not require the slots.

Once the vehicle is designed for a hardtop, such as illustrated in FIGS. 7–11, the soft top such as in FIGS. 1–6, such as in FIGS. 1–6, may be substituted without altering the vehicle's structure or geometry. Both have the same pivot bracket location and pivot bracket attachment points (shown at 11 and 13 in FIG. 1). All the surrounding areas, such as the side door glass, the decklid, and the windshield header (shown at 15 in FIG. 1) can be the same for the soft top and hardtop. For the retractable hardtop, it is preferred that an articulating decklid is provided which moves out of the way such that the hardtop can retract into the luggage compartment. The same decklid system may be used with the soft top. A tonneau system for covering the retracted hardtop and/or providing a package shelf when the roof is extended, may be common for both the hardtop and soft top variations. The outside silhouettes of the soft top and the hardtop may be different from one another, without other changes to the car.

I claim:

1. A retractable top system for a vehicle having a passenger compartment and a storage area behind the passenger compartment, the vehicle having a body and a windshield defining the forward end of the passenger compartment, the windshield having a header, the passenger compartment having opposed lateral edges, the top system having an extended position wherein the top system defines a roof over the passenger compartment and interconnects with the windshield header and a retracted position wherein the top system does not cover the passenger compartment and at least a portion of the top system is disposed in the storage area, the top system comprising:

a front section having a forward edge and a rearward edge, the forward edge of the front section interconnecting with the windshield header and the front section defining at least part of the front portion of the roof when the top system is in the extended position, the front section having an inner surface and an opposed outer surface, the inner surface facing the passenger compartment when the top system is in the extended position;

a middle section disposed rearwardly of the front section when the top system is in the extended position, the middle section having a forward edge and a rearward edge, the forward edge being disposed adjacent the rearward edge of the front section when the top is in the extended position, the middle section having an inner surface and an opposed outer surface, the inner surface facing the passenger compartment when the top system is in the extended position;

a rear section disposed rearwardly of the middle section when the top system is in the extended position, the rear section having a forward edge, an opposed rearward edge and a pair of opposed side edges extending between the forward and rearward edges, the forward edge of the rear section being disposed adjacent the rearward edge of the middle section when the top system is in the extended position, the rear section being a rigid panel extending generally continuously from one lateral edge of the passenger compartment to the other lateral edge and between the forward and rearward edges; and a flexible roof membrane having a forward edge proximate the forward edge of the front section, the roof membrane extending rearwardly so as to cover at least the outer surfaces of the front section and the middle section when the top system is in the extended position;

wherein when the top system is in the retracted position, the outer surface of the front section is directed upwardly and the outer surface of the middle section is directed downwardly.

2. The top system according to claim 1, wherein:

the front section bus a pair of opposed sides extending between the forward and rearward edges, the front section being a rigid panel extending generally continuously between the opposed sides and between the forward and rearward edges; and the middle section has a pair of opposed sides extending between the forward and rearward edges, the front section being a rigid panel extending generally continuously between the opposed sides and between the forward and rearward edges.

3. The top system according to claim 2, wherein a rear window forms a portion of the rear section.

4. The top system according to claim 3, wherein the flexible roof membrane covers substantially all of the front, middle, and rear sections, except for the rear window.

5. The top system according to claim 1, wherein:

the front section is an open frame for supporting part of the flexible membrane; and the middle section is an open frame for supporting another part of the flexible membrane.

6. The top system according to claim 5, wherein a rear window forms a portion of the rear section.

7. The top system according to claim 6, wherein the flexible roof membrane covers substantially all of the front, middle, and rear sections, except for the rear window.

8. The top system according to claim 5, wherein the front section includes a pair offside members with at least one transverse bow extending between the side members.

9. The top system according to claim 8, wherein the front section further includes a rigid header portion extending transversely between the side members adjacent the forward edge of the front section.

10. The top system according to claim 5, wherein the middle section includes a pair of side members with at least one transverse bow extending between the side members.

11. The top system according to claim 10, wherein the middle section includes two transverse bows extending between the side members.

12. The top system according to claim 1, further comprising a pair of first links and a pair of second links, each of the links having one end pivotally interconnected with the rear section and another end pivotally interconnected with the middle section, the links and the middle and rear sections forming a pair of parallel four bar linkages operable to articulate the middle section with respect to the rear section such that when the top system is in the retracted position the middle section nests with the rear section and the outer surface of the middle section is adjacent the inner surface of the rear section.

13. The top system according to claim 12, further comprising a pair of balance links each having a first end pivotally interconnected with the vehicle body and a second end pivotally interconnected with one of the first links between the one end and the other end of the first link.

14. The top system according to claim 1, wherein the rearward edge of the front section is pivotally interconnected to the forward edge of the middle section.

15. The top system according to claim 1, wherein the outer surface of the rear section is directed downwardly when the top system is in the retracted position.

16. The top system according to claim 1, wherein the rear section is pivotally interconnected with the vehicle body adjacent the rearward edge of the rear section.

17. A retractable top system for a vehicle having a passenger compartment and a storage area behind the passenger compartment, the vehicle having a body and a windshield defining the forward end of the passenger compartment, the windshield having a header, the top system having an extended position wherein the top system defines a roof over the passenger compartment and interconnects with the windshield header and a retracted position wherein the top system does not cover the passenger compartment and at least a portion of the top system is disposed in the storage area, the top system comprising:

a front section having a forward edge and a rearward edge, the forward edge of the front section interconnecting with the windshield header and the front section defining at least part of the front portion of the roof when the top system is in the extended position, the front section having an inner surface and an opposed outer surface, the inner surface facing the passenger compartment when the top system is in the extended position;

a rear section disposed rearwardly of the front section when the top system is in the extended position, the rear section having a forward edge an opposed rearward edge and a pair of opposed side edges extending between the forward and rearward edges, the rear section being a rigid panel extending between the opposed side edges and between the forward and rearward edges; and a flexible roof membrane having a forward edge proximate the forward edge of the front section, the roof membrane extending rearwardly so as to cover at least the upper surface of the front section when the top system is in the extended position:

wherein when the top system is in the retracted position, the outer surface of the front section is directed upwardly and the outer surface of the rear section is directed downwardly.

18. The top system according to claim 17, wherein:

the front section has a pair of opposed sides extending between the forward and rearward edges, the front section being a rigid panel extending generally continuously between the opposed sides and between the forward and rearward edges.

19. The top system according to claim 18, wherein a rear window forms a portion of the rear section.

20. The top system according to claim 19, wherein the flexible roof membrane covers substantially all of the front and rear sections, except for the rear window.

21. The top system according to claim 17, wherein:
the front section is an open frame for supporting part of the flexible membrane.

22. The top system according to claim 21, wherein a rear window forms a portion of the rear section.

23. The top system according to claim 22, wherein the flexible roof membrane covers substantially all of the front and rear sections, except for the rear window.

24. The top system according to claim 21, wherein the front section includes a pair of side members with at least one transverse bow extending between the side members.

25. The top system according to claim 24, wherein the front section further includes a rigid header portion extending transversely between the side members adjacent the forward edge of the front section.

26. The top system according to claim 17, wherein the rear section is pivotally interconnected with the vehicle body adjacent the rearward edge of the rear section.

27. A vehicle being provided with either a retractable hardtop or a retractable soft top during manufacture, the vehicle having substantially common body structures, the vehicle having a passenger compartment and a storage area behind the passenger compartment, the vehicle further having a body and a windshield defining the forward end of the passenger compartment and a plurality of attachment points for connecting the retractable top thereto, the vehicle comprising:
one of a top selected from the group consisting of a retractable soft top and a retractable hard top;
the retractable soft top having an extended position wherein the cop defines a roof over the passenger compartment and interconnects with the windshield header and a retracted position wherein the top does not cover the passenger compartment and at least a portion of the top is disposed in the storage area, the soft top comprising:
a plurality of roof sections, at least one section being an open frame, each of the sections having an inner surface and an opposed outer surface, the inner surfaces facing the passenger compartment when the soft top is in the extended position; and
a flexible membrane covering at least a portion of the outer surfaces of each of the roof sections; and
the retractable hard top having an extended position wherein the top defines a roof over the passenger compartment and interconnects with the windshield header and a retracted position wherein the top does not cover the passenger compartment and at least a portion of the top is disposed in the storage area, the hard top comprising:
a plurality of roof sections, each of the roof sections having a forward edge, an opposed rearward edge, and a pair of opposed side edges extending between the forward and rearward edges, each roof section being a rigid panel extending generally continuously between the forward and rearward edges and between the opposed side edges;
wherein the attachment points are common to both tops.

28. The vehicle according to claim 27, wherein each of the plurality of roof sections of the hard top has an inner surface and an opposed outer surface, the inner surface facing the passenger compartment when the top is in the extended position, the hard top further comprising a flexible membrane covering at least a portion of the outer surface of each of the roof sections when the hard top is in the extended position.

29. The vehicle according to claim 27, wherein one of the roof sections of the soft tap is a rear section, the rear section having a forward edge, an opposed rearward edge, and a pair of opposed side edges extending between the forward and rearward edges, the rear section being a rigid panel extending generally continuously between the forward and rearward edges and between the opposed side edges.

30. The vehicle according to claim 27, wherein the plurality of roof sections of the retractable soft top comprises a front roof section, a middle roof section, and a rear roof section.

31. The vehicle according to claim 27, wherein the plurality of roof sections of the retractable hard top comprises a front roof section, a middle roof section, and a rear roof section.

32. A vehicle being provided with either a retractable hard top or a retractable soft top during manufacture, the vehicle having a passenger compartment and a storage area behind the passenger compartment, the vehicle further having a body and a windshield defining the forward end of the passenger compartment and a plurality of attachment points for connecting the retractable top thereto, the vehicle comprising:
one or a top selected from the group consisting of a retractable soft top and a retractable hard top;
the retractable soft top having an extended position wherein the top defines a roof over the passenger compartment and interconnects with the windshield header and a retracted position wherein the top does not cover the passenger compartment and at least a portion of the top is disposed in the storage area, the soft top comprising:
a front section having a forward edge and a rearward edge, the forward edge of the front section interconnecting with the windshield header and the front section defining at least part or the front portion of the roof when the soft top is in the extended position, the front section having an inner surface and an opposed outer surface, the inner surface facing the passenger compartment when the soft top is in the extended position;
a middle section disposed rearwardly of the front section when the soft top is in the extended position, the middle section having a forward edge and a rearward edge, the forward edge being disposed adjacent the rearward edge of the front section when the top is in the extended position, the middle section having an inner surface and an opposed outer surface, the inner surface facing the passenger compartment when the soft top is in the extended position;
a rear section disposed rearwardly of the middle section when the soft top is in the extended position, the rear section having a forward edge, an opposed rearward edge and a pair of opposed side edges extending between the forward and rearward edges, the forward edge of the rear section being disposed adjacent the rearward edge of the middle section when the soft top is in the extended position, the rear section being a rigid panel extending between the opposed side edges and between the forward and rearward edges; and a flexible roof membrane having a forward edge proximate the forward edge of the front section, the roof membrane extending rearwardly so as to cover at least the upper surfaces of the front frame and the middle frame when the soft top is in the extended position:

wherein when the soft top is in the retracted position, the outer surface of the front frame is directed upwardly; and the retractable hard top having an extended position wherein the top defines a roof over the passenger compartment and interconnects with the windshield header and a retracted position wherein the top does not cover the passenger compartment and at least a portion of the top is disposed in the storage area, the hard top comprising:

a plurality of roof sections, each of the roof sections having a forward edge, an opposed rearward edge, and a pair of opposed side edges extending between the forward and rearward edges, each roof section being a rigid panel extending generally continuously between the forward and rearward edges and between the opposed side edges;

wherein the attachment points are common to both tops.

33. A vehicle being provided with either a retractable hard top or a retractable soft top during manufacture, the vehicle having a passenger compartment and a storage area behind the passenger compartment, the vehicle further having a body and a windshield defining the forward end of the passenger compartment and a plurality of attachment points for connecting the retractable top thereto, the vehicle comprising:

one of a top selected from the group consisting of a retractable soft top and a retractable hard top;

the retractable soft top having an extended position wherein the top defines a roof over the passenger compartment and interconnects with the windshield header and a retracted position wherein the top does not cover the passenger compartment and at least a portion of the top is disposed in the storage area, the soft top comprising:

a rear section defining the rearmost portion of the roof when the soft top is in the extended position, the rear section having a forward edge, an opposed rearward edge and a pair of opposed side edges extending between the forward and rearward edges, the rear section having an inner surface and an opposed outer surface, the inner surface facing the passenger compartment when the soft top is in the extended position, the rear section being a rigid panel extending between the opposed side edges and between the forward and rearward edges; and a forward section disposed forwardly of the rear section when the top is in the extended position, the forward section being an open frame, the forward section having an inner surface and an opposed outer surface, the inner surface facing the passenger compartment when the soft top is in the extended position:

a pair of first links and a pair of second links, each of the links having one end pivotally interconnected with the rear section and another end pivotally interconnected with the forward section, the links and the forward and rear sections forming a pair of parallel four bar linkages operable to articulate the forward section with respect to the rear section such that when the soft top is in the retracted position the forward section nests with the rear section and the outer surface of the forward section is adjacent the inner surface of the rear section; and a flexible roof membrane covering at least the outer surface of the forward section when the soft top is in the extended position; and the retractable hard top, the hard top having an extended position wherein the top defines a roof over the passenger compartment and interconnects with the windshield header and a retracted position wherein the top does not cover the passenger compartment and at least a portion of the top is disposed in the storage area, the hard top comprising:

a plurality of roof sections, each of the roof sections having a forward edge, an opposed rearward edge, and a pair of opposed side edges extending between the forward and rearward edges, each roof section being a rigid panel extending generally continuously between the forward and rearward edges and between the opposed side edges;

wherein the attachment points are common to both tops.

34. The vehicle according to claim 32, wherein each of the plurality of roof sections of the hard top has an inner surface and an opposed outer surface, the inner surface facing the passenger compartment when the top is in the extended position, the hard top further comprising a flexible membrane covering at least a portion of the outer surface of each of the roof sections when the hard top is in the extended position.

35. The vehicle according to claim 32, wherein the plurality of roof sections of the retractable hard top comprises a front roof section, a middle roof section, and a rear roof section.

36. The vehicle according to claim 33, wherein each of the plurality of roof sections of the hard top has an inner surface and an opposed outer surface, the inner surface facing the passenger compartment when the top is in the extended position, the hard top further comprising a flexible membrane covering at least a portion of the outer surface of each of the roof sections when the hard top is in the extended position.

37. The vehicle according to claim 33, wherein the soft top further comprises a front section disposed forwardly of the forward section when the soft top is in the extended position, the front section having a forward edge and a rearward edge, the forward edge of the front section interconnecting with the windshield header and the front section defining at least part of the front portion of the roof when the top system is in the extended position, the front section having an inner surface and an opposed outer surface, the inner surface racing the passenger compartment when the top system is in the extended position; and the flexible roof membrane further covering the outer surface of the front section when the top is in the extended position.

38. The vehicle according to claim 33, wherein the plurality of roof sections of the retractable hard top comprises a front roof section, a middle roof section, and a rear roof section.

* * * * *